United States Patent
Walthert et al.

(10) Patent No.: US 9,616,963 B2
(45) Date of Patent: Apr. 11, 2017

(54) QUICK RELEASE DEVICE

(71) Applicant: DT Swiss Inc., Grand Junction, CO (US)

(72) Inventors: Martin Walthert, Aarberg (CH); Stefan Spahr, Lengnau (CH); Matthias Meier, Nidau (CH)

(73) Assignee: DT SWISS INC., Grand Junction, CO (US)

( * ) Notice: Subject to any disclaimer, the term of this patent is extended or adjusted under 35 U.S.C. 154(b) by 0 days.

(21) Appl. No.: 14/832,855

(22) Filed: Aug. 21, 2015

(65) Prior Publication Data

US 2016/0052588 A1 Feb. 25, 2016

(30) Foreign Application Priority Data

Aug. 22, 2014 (DE) ........................ 10 2014 112 084

(51) Int. Cl.
*B62K 25/02* (2006.01)
*B60B 27/02* (2006.01)

(52) U.S. Cl.
CPC ............ *B62K 25/02* (2013.01); *B60B 27/026* (2013.01); *B62K 2025/025* (2013.01); *B62K 2206/00* (2013.01)

(58) Field of Classification Search
CPC  B60B 27/026; B62K 25/02; B62K 2025/025; B62K 2206/00; B62K 19/36
See application file for complete search history.

(56) References Cited

U.S. PATENT DOCUMENTS 4,598,614 A * 7/1986 Kipp .................. G05G 1/12
                                              81/58.3
6,089,675 A * 7/2000 Schlanger ............ B60B 27/023
                                              280/279

(Continued)

FOREIGN PATENT DOCUMENTS

DE        29714945 U1    11/1997
DE     202011109857 U1    5/2012

(Continued)

OTHER PUBLICATIONS

German Search Report from German Priority Application No. 10 2014 112 084.1, dated Aug. 4, 2015.

*Primary Examiner* — Kip T Kotter
(74) *Attorney, Agent, or Firm* — Greer, Burns & Crain, Ltd.

(57) ABSTRACT

A quick release device for at least partially muscle-powered two-wheeled vehicles such as bicycles, having an axle unit and a clamping mechanism. The axle unit includes an axle extending axially, a locking means at a first end of the axle unit and a fastener at a second end of the axle unit. The clamping mechanism is suitable for mounting and demounting the axle unit to a two-wheeled vehicle. The clamping mechanism includes an operating lever and a clamping component connected therewith. The clamping component can be non-rotatably coupled with the axle unit and can be decoupled from the axle unit. The operating lever of the clamping mechanism can be moved from an engagement position in which it is non-rotatably connected with the clamping component to a rotary position in which it is freely rotatable relative to the clamping component, while the clamping component is non-rotatably coupled with the axle unit.

18 Claims, 5 Drawing Sheets

(56) References Cited

U.S. PATENT DOCUMENTS

| | | | | |
|---|---|---|---|---|
| 8,696,213 B2* | 4/2014 | Spahr | ................... | B60B 27/026 |
| | | | | 301/110.5 |
| 2003/0025292 A1* | 2/2003 | Hargroder | ............ | A61G 5/1024 |
| | | | | 280/250.1 |
| 2007/0145814 A1* | 6/2007 | D'Aluisio | ............ | B60B 1/0223 |
| | | | | 301/111.06 |
| 2007/0154286 A1* | 7/2007 | Spahr | ................... | B62K 25/02 |
| | | | | 411/402 |
| 2009/0102276 A1* | 4/2009 | Mercat | ................. | B62K 25/02 |
| | | | | 301/124.2 |
| 2015/0054254 A1* | 2/2015 | Spahr | ................... | B62K 25/02 |
| | | | | 280/278 |

FOREIGN PATENT DOCUMENTS

| | | | | |
|---|---|---|---|---|
| IT | 1400057 B1 * | 5/2013 | ............ | B62K 25/02 |
| WO | 2008145496 A2 | 12/2008 | | |

* cited by examiner

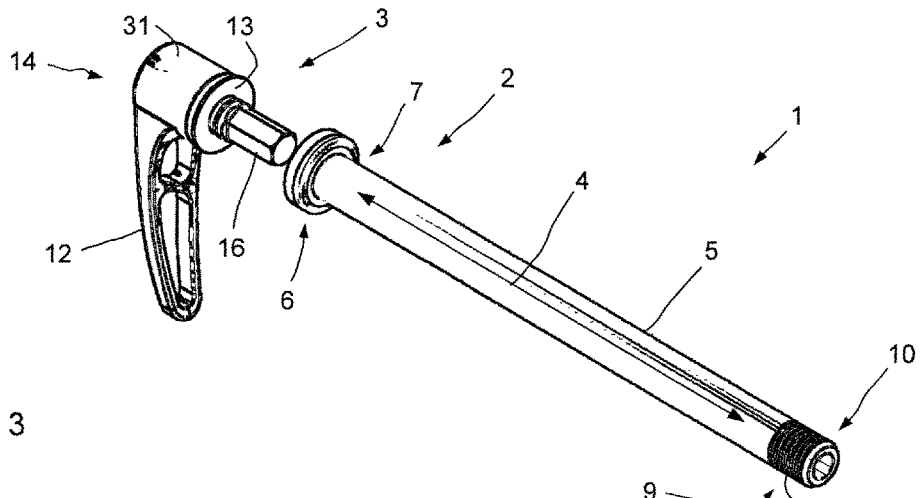
Fig. 3
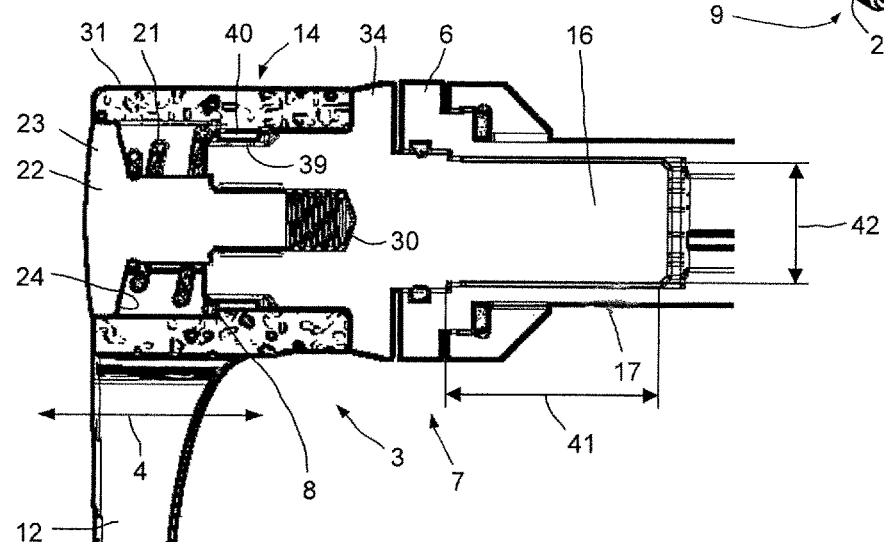
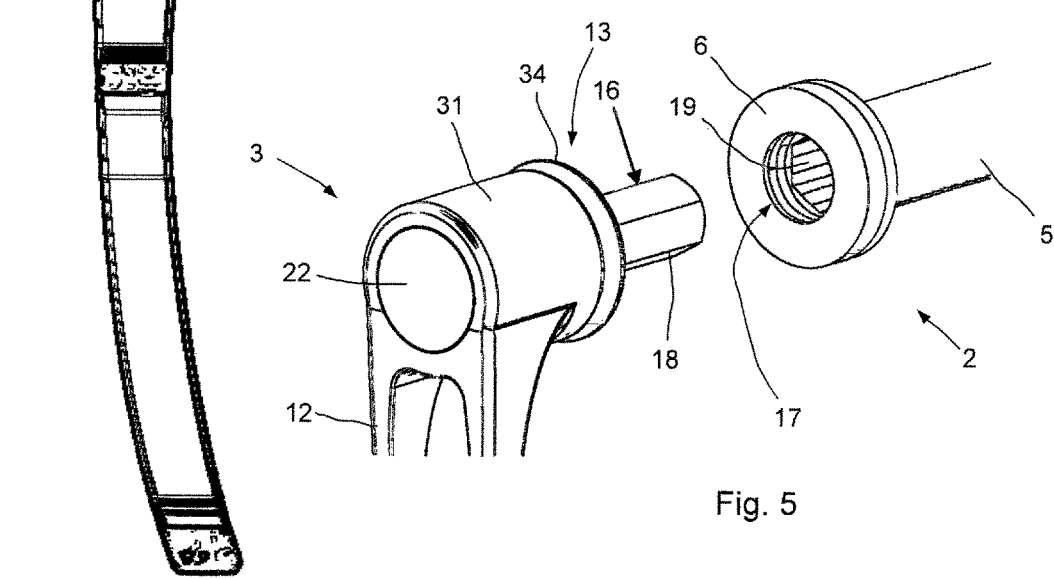
Fig. 4a
Fig. 5

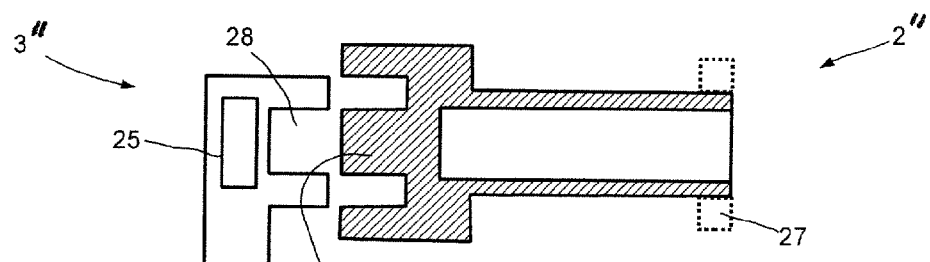
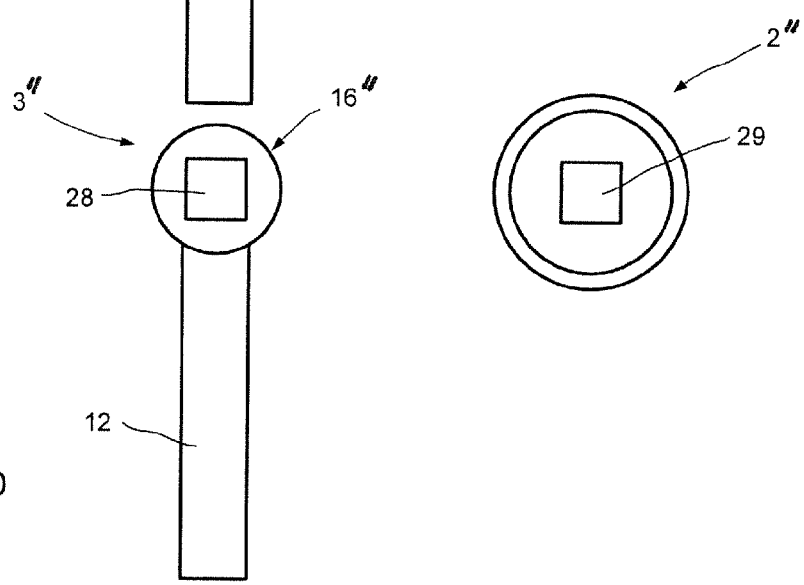
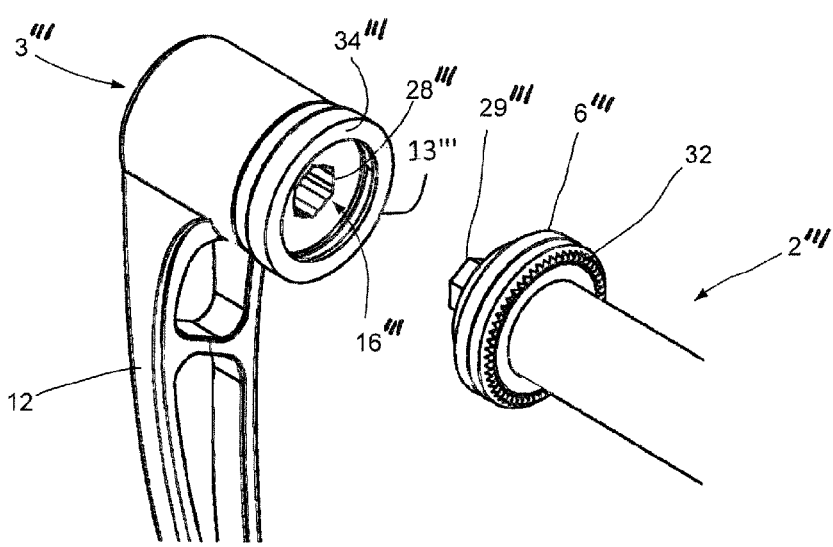

QUICK RELEASE DEVICE

BACKGROUND

The present invention relates to a quick release device, in particular for at least partially, and preferably primarily, muscle-powered two-wheeled vehicles such as bicycles.

Many different types of quick release devices for attaching the wheels of bicycles have become known in the prior art. The wheels of racing bicycles are for example releasably attached by using quick release devices wherein the required locking forces are generated by tilting over the quick release lever. In particular, in the case of mountain bikes, and also in other bicycles it has been shown that the rigidity generated by the applied retaining force can be improved further.

EP 1 801 005 B1 has disclosed a quick release for bicycles where the clamping force is not generated by tilting the quick release lever but is independent thereof. The quick release lever is connected with a screw thread so that the desired clamping force is applied by the number of rotations of the quick release lever. For placing the quick release lever in the desired rest position, the quick release lever can be pulled axially outwardly and can be freely rotated to the desired rest position. This quick release device works reliably and allows ease of operation. The drawbacks are the comparatively complicated mechanism of the quick release device and the comparatively high weight.

A quick release has become known in the market which is also described in the Italian patent application IT FI 2010 0089 A1 having the number 140057. This quick release interacts with a through axle. The through axle comprises a thread at one end of the through axle and at the other end, an insertion opening for a separate quick release lever. For the purpose of mounting the insertion end of the quick release lever is inserted into the insertion opening of the through axle wherein an external hexagon at the insertion end of the quick release lever comes into engagement with a corresponding internal hexagon in the through axle. Rotating the quick release lever will now also rotate the form-fittingly connected through axle so that an appropriate number of rotary motions of the quick release lever obtains the desired retaining force of the wheel. Since only one quick release lever needs to be provided for both the front wheel and the rear wheel, this already allows to save half the weight. Moreover such a quick release can on the whole be designed so as to weigh less than a quick release according to EP 1 801 005 B1.

The insertion end of the quick release lever according to IT FI 2010 0089 A1 shows such a length that in mounting or demounting the quick release lever can be pulled out of the through axle a certain amount while the external hexagon still retains sufficient engagement with the internal hexagon of the through axle. In this way there is no risk of the operator's finger being pinched between the bicycle frame and the quick release lever in one complete rotation of the quick release lever. When the desired clamping force is obtained, the quick release lever is pushed back in. Or else the quick release lever can be briefly pulled out of the through axle, rotated to a preferred angular position, and then pushed back in. Both ease of operation and a low total weight are possible. The insertion part inserted into the through axle must consist of a strong material and have a length so that even when it is partially pulled out, the remaining contact surface with the through axle is sufficient without applying the required locking forces. This is why the total weight of the quick release is higher than it is actually required.

SUMMARY

It is therefore the object of the present invention to provide a quick release device which enables a still more reduced total weight and/or easier operation.

A quick release device according to the invention is in particular provided for at least partially, and preferably primarily, muscle-powered two-wheeled vehicles such as bicycles and comprises an axle unit and a clamping mechanism. The axle unit comprises an axle extending in the axial direction respectively an axle defining an axial direction. The axle unit furthermore comprises a locking means at a first end of the axle unit and a fastener at a second end of the axle unit. The clamping mechanism serves or is suitable to mount and demount the axle unit to and from a two-wheeled vehicle. The clamping mechanism comprises an operating lever and a clamping component connected therewith. The clamping component can be non-rotatably coupled to the axle unit e.g. manually. The clamping component may also be decoupled from the axle unit e.g. manually. No further tools are required for coupling and decoupling the clamping component to and from the axle unit. The operating lever of the clamping mechanism can be moved from an engagement position in which it is non-rotatably connected with the clamping component, to a rotary position in which it is freely rotatable relative to the clamping component, while the clamping component may be, and in particular is, non-rotatably coupled to the axle unit. This means that the clamping component is e.g. non-rotatably coupled to the axle unit while the operating lever of the clamping mechanism can at the same time be shifted to the rotary position in which the operating lever is freely rotatable relative to the clamping component.

This allows to freely select the orientation of the operating lever relative to the clamping component without decoupling the clamping mechanism from the axle unit. This is very advantageous since it allows still greater ease of mounting where the operating lever is not rotated completely a number of times but the user's hand can rotate it by small angles of e.g. 30 degrees, 45 degrees or 60 degrees to then move the operating lever back from the engagement position to the rotary position from where it is once again rotated so as to further close the quick release device respectively to increase the clamping force applied.

This allows a considerably shorter design of the clamping component than it had been possible in the prior art when using a removable operating lever. The operating lever or the quick release device according to the present invention does not need to be pulled out of the axle unit some distance for ease of mounting but it may remain pushed entirely in the axle unit until the desired clamping force is applied by way of simple operation involving no risk of pinching one's fingers.

This allows to save a considerable portion of the weight of the clamping component since the length of engagement can for example be halved compared to the prior art. Since the clamping component is as a rule made of a high-strength material and in particular of metal and preferably steel, this saves a considerable portion of the weight. The axle unit may at least partially or entirely consist of a lightweight metal and in particular of a light metal. Or else, steel or fiber-reinforced plastic may be used.

The clamping mechanism of the present invention is suitable to mount and demount the front wheel, the rear wheel, and for example also the seat post or the saddle, if it is provided with a mounting aid matching the clamping component.

The clamping mechanism cannot only be coupled to and decoupled from the axle unit but it may be configured to be entirely removed from the axle unit.

Preferably the clamping component comprises a coupling unit with a non-round coupling contour for coupling with a mating connecting unit having at the axle unit a connecting contour configured non-round. This means that the non-round coupling contour of the coupling unit can be coupled with the connecting contour of the axle unit that is configured non-round to selectively establish a non-rotatable connection.

In a preferred specific embodiment of the invention the coupling unit of the clamping component is inserted into the connecting contour for mounting and demounting. It is also possible and preferred to place the coupling unit of the clamping component on the connecting contour of the connecting unit for mounting and demounting. It is also possible to insert part of the coupling unit into the connecting unit for mounting and/or demounting while another part of the coupling unit is pushed or applied onto another part of the connecting unit. Preferably one of the two parts to be coupled with one another is configured "male" and the other coupling part is configured "female" so as to obtain an exactly fitting and non-rotatable coupling.

In a preferred configuration the coupling unit shows an outer polygon and/or inner polygon. The coupling unit may for example comprise an outer multi-edge profile and/or an inner multi-edge profile to establish an exactly fitting and non-rotatable coupling with the connecting unit.

It is advantageous to provide at least one click-in mechanism for the clamping component to click into the axle unit. This is to ensure accommodation of the clamping component on the axle unit that is at least substantially secure against loss. Absent extraordinary external forces such a click-in mechanism offers secure protection against loss. The click-in mechanism may comprise multiple click-in units to allow clicking-in in different rotary positions.

In a particularly preferred configuration the operating lever can be moved from the engagement position to the rotary position by movement in the axial direction relative to the clamping component.

It is particularly preferred for the operating lever to be moved from the engagement position to the rotary position by way of axial movement away from the clamping component. In a simple case this allows to pull the operating lever for transferring from the engagement position to the rotary position.

In preferred embodiments the operating lever is biased toward the clamping component by means of a biasing device. This biasing device may comprise a coil spring or multiple coil springs or other spring types. Biasing by way of magnetic force or other forces is likewise possible. Biasing the operating lever in the direction toward the clamping component and thus to the engagement position ensures that the user can for example directly increase the clamping force or else release the quick release device as he grips the operating lever. Or else it is possible to bias the quick release device to the rotary position so that inadvertent contact with the operating lever leaves the clamping force unchanged. To ensure a defined angular position of the operating lever in this configuration as well, free rotational movement of the operating lever may be impeded by way of friction or the like so as to retain a rotary position once it is set. It is also possible for the operating lever to be configured for clicking in one rotary position or in a specified number of rotary positions.

In advantageous configurations the clamping component shows at one of its ends the coupling unit for coupling with the axle unit, and at the other of its ends an in particular mushroom-shaped push button. The push button is preferably provided with a circumferential collar that forms a counter bearing for the biasing device which biases the operating lever to a preferred base position and in particular to the engagement position. The circumferential collar may comprise gaps.

In a preferred configuration the operating lever is coupled with the axle unit via a torque limiter in the engagement position. This torque limiter serves to limit the maximum torque of the operating lever to avoid too high clamping forces acting on the quick release device. The torque limiter may be configured as it is usual and disclosed in the prior art. The transmitted torque may be adjustable or else fixedly specified.

In all the configurations it is preferred for the axle unit to be configured hollow at least at the second end. It is possible and preferred for the axle of the axle unit to comprise a continuous opening in its interior.

Preferably the axle unit comprises an external thread at the second end to provide a fastener. Or else it is possible for the fastener to comprise a bayonet joint which enables fixed accommodation on the frame of a two-wheeled vehicle in one angular position while in another angular position the bayonet joint may e.g. be removed from the frame of the two-wheeled vehicle. Such a bayonet joint may be configured e.g. in the shape of a key/keyhole, interacting with the mating design of the frame.

In all the configurations it is preferred that both the operating lever and the clamping component show non-round, mating engagement contours which are engaged with one another in the engagement position. Since the engagement contours of the operating lever and the clamping component only overlap over a certain axial width, the engagement contours can be disengaged by way of relative axial displacement of the operating lever so that the operating lever is brought to the rotary position where it can freely rotate in both rotational directions.

The non-round engagement contours at the operating lever and the clamping component may be configured for example in the shape of toothing. Configurations with outer and inner polygons or with outer and inner multi-edge surfaces are preferred. Radial toothing at the operating lever and the clamping component is particularly preferred wherein the operating lever preferably comprises a radial internal toothing and the clamping component comprises a radial external toothing. It is also possible for the operating lever to be in engagement with the clamping component by way of axial toothing serving as engagement contours.

The operating lever preferably comprises, or is fixedly connected with, a clamping sleeve wherein the clamping sleeve is preferably provided with the non-round engagement contour.

In all the configurations the ratio of a length of overlap of the coupling unit and the connecting unit in engagement with one another, relative to a diameter of the coupling unit, is preferably less than 4:1 and preferably less than 3:1 and it may in particular be less than 2:1. Particularly preferably the ratio of the portion of the clamping component respectively of the coupling unit that can be inserted into a connecting unit, to the diameter of the portion of the clamping component that can be inserted, is less than 4:1 and preferably less than 3:1, if the coupling unit of the clamping component is configured as a "male part". Given a coupling unit of the clamping component that is configured as a "female part" then a length of the insertable portion of the connecting unit is less than four times, and in particular less than three times, its diameter.

A clamping mechanism according to the invention serves to mount bicycle components to, and demount them from, in particular at least partially muscle-powered two-wheeled vehicles such as bicycles. Such a clamping mechanism comprises an operating lever and a clamping component connected therewith, wherein the clamping component can preferably be manually coupled non-rotatably with a bicycle component. The clamping component is preferably provided for manual decoupling from the bicycle component. The operating lever can be moved from an engagement position in which it is non-rotatably connected with the clamping component, to a rotary position in which it is freely rotatable relative to the clamping component, in particular also while the clamping component is non-rotatably coupled with the axle unit and thus with the bicycle component.

The clamping mechanism according to the invention also has many advantages since it allows ease of operation while providing a reduced total weight. The clamping mechanism does not require a clamping component of a large axial length since it is not necessary to pull the clamping component partially out of a bicycle component for operating the operating lever without the risk of pinching fingers. The operating lever for generating the desired clamping force or for reducing the applied clamping force may be rotated a certain amount and then transferred to the rotary position. Then the operating lever can be rotated back without affecting the clamping force. Thereafter the operating lever is once again brought to the engagement position where it is rotated to further increase (or decrease) the clamping force. Therefore the clamping component can be designed shorter and lighter in weight. The clamping component does not need to be configured any longer than required to ensure non-rotatable coupling even with the clamping component half pulled out.

A clamping mechanism according to the invention can be employed for mounting and demounting a great variety of bicycle components so that only one single, suitable clamping mechanism needs to be stored on a two-wheeled vehicle. Optionally the user may carry the clamping mechanism on his person or in a backpack or a bag or the like so that the bicycle components attached by means of the clamping mechanism are protected from theft to a certain degree.

In preferred embodiments the clamping mechanism is configured in the same way as a clamping mechanism of a quick release device described above.

A two-wheeled vehicle according to the invention comprises a frame, a fork, an at least partially muscle-powered drive, and two wheels, a front wheel and a rear wheel. Each wheel comprises a hub and a pertaining axle unit. A clamping mechanism with an operating lever and a clamping component connected therewith are disposed. The clamping component can be e.g. manually, non-rotatably coupled with the axle unit. The clamping component may also be decoupled from the axle unit e.g. manually. The operating lever of the clamping mechanism can be moved from an engagement position in which the operating lever is non-rotatably connected with the clamping component, to a rotary position in which the operating lever is freely rotatable relative to the clamping component, in particular also while the clamping component is non-rotatably coupled to the axle unit.

The two-wheeled vehicle according to the invention also has many advantages. The two-wheeled vehicle may be provided with a reduced total weight on the whole since using the clamping mechanism allows to save weight overall. At the same time, simple operation is enabled. Preferably exactly one clamping mechanism is provided for mounting and demounting the two wheels.

In preferred configurations the two-wheeled vehicle comprises at least one quick release device as it has been described above.

Particularly preferably the clamping mechanism is releasably attached to the axle unit of the rear wheel. Particularly preferably the front wheel is not provided with a clamping mechanism. This allows to achieve improved aerodynamics since an operating lever protruding outwardly at the front wheel would interfere with aerodynamics. At the same time the total weight is reduced and simpler operation is enabled.

On the whole the invention allows a reduced total weight of a quick release device and of a bicycle, in particular since one single clamping mechanism is sufficient for a two-wheeled vehicle. Disposing the clamping mechanism with the operating lever at the rear wheel improves the optical appearance and in particular the aerodynamics. The costs can be reduced since one single lever is employed for the entire bicycle. The clamping mechanism may serve not only to mount the wheels but for example also to clamp the saddle.

Employing a conventional inner multi-edge profile or the like at the interface between the clamping component and the axle unit then allows a mechanic, for example during a race, to quickly and safely remove and attach the wheel by means of a screwdriver (e.g. power-operated). The rider may still use the time waiting for the service mechanic to start releasing the wheel.

Surprisingly it has been found that, although the entire clamping mechanism is more complicated, a quick release device providing enhanced ease of operation and a reduced total weight is enabled.

All of the configurations also offer the considerable advantage that the angle of orientation of the operating lever is independent of the angle between the clamping component and the axle unit. For example if a square or hexagon is provided for the coupling unit of the clamping component and the connecting unit of the axle unit (one as a male part and the other, a mating female part), then the clamping component can be placed in exactly four or six different angular positions. With the present invention the orientation angle may also be adjusted by way of the relative angular position of the engagement contours of the operating lever relative to those of the clamping component. When toothing having 12 and in particular at least 18 and preferably 24 teeth or more (or rounded projections protruding outwardly or inwardly) is employed, then the operating lever can be set in a multitude of positions. Then the desired angle of rotation can be adjusted mating the fork or the dropouts.

BRIEF DESCRIPTION OF THE DRAWINGS

Further advantages and features of the present invention can be taken from the exemplary embodiments which will be discussed below with reference to the enclosed figures.

The figures show in:

FIG. 3 an overall view of a quick release device according to the invention;

FIG. 4a an enlarged section of the quick release device according to FIG. 3 in the engagement position;

FIG. 5 a perspective view of the quick release device according to FIG. 3;

FIG. 9 a schematic sectional view of another quick release device;

FIG. 10 a front view of the components of the quick release device according to FIG. 9;

FIG. 11 still another perspective illustration of a quick release device according to the invention;

DETAILED DESCRIPTION

Figure 1:
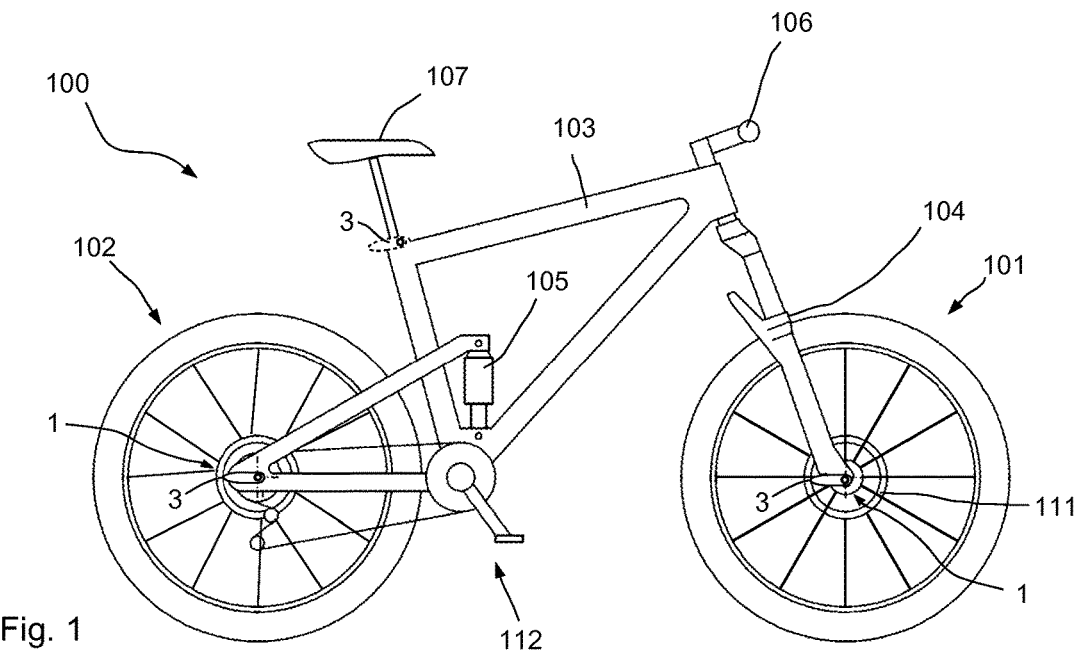
FIG. 1 a schematic side view of a mountain bike.

FIG. 1 shows a schematic illustration of a mountain bike as the bicycle or two-wheeled vehicle 100. The bicycle comprises a front wheel 101, a rear wheel 102, a frame 103, a suspension fork 104, a rear wheel damper 105, a handlebar 106, and a saddle 107. The drive 112 is provided by means of pedals and in this case, a chain shifting device associated with the rear wheel 102. The front wheel 101 and the rear wheel 102 are each attached to the frame 103 by means of a quick release device 1. The quick release device 1 comprises a clamping mechanism 3 shown in a dotted line at the seat post of the saddle 107, which may also be used to adjust the saddle height.

Figure 2:
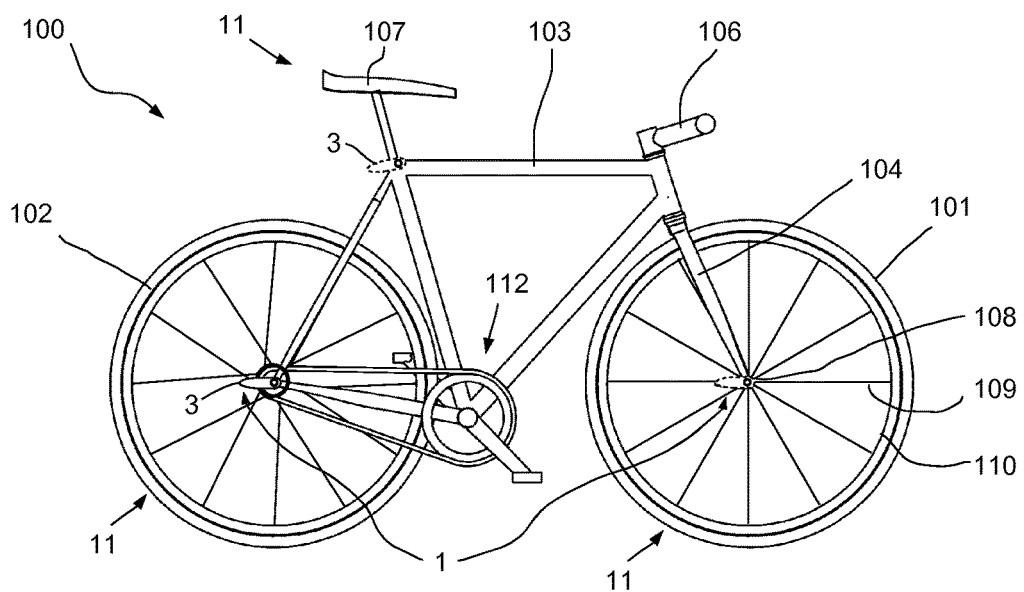
FIG. 2 a schematic side view of a racing bicycle or a roadster.

FIG. 2 shows a simplistic side view of a racing bicycle or roadster representing a two-wheeled vehicle 100, wherein the bicycle again comprises a front wheel 101 attached to the fork 104 and a rear wheel 102 which are fastened respectively to the frame 103. Both the front wheel and the rear wheel 101, 102 comprise spokes 109 and a rim 110. A disk brake 111 (see FIG. 1) may, but does not have to, be provided. In this case a quick release device 1 is shown at the rear wheel, including a clamping mechanism 3. The clamping mechanism 3 of the quick release device 1 can be removed from the rear wheel 102 and applied to the front wheel 101, as FIG. 2 shows in a dotted line, for mounting and demounting the front wheel as well. The clamping mechanism 3 may also serve to adjust the height of the saddle 107. The front wheel 101, the rear wheel 102, and the seat post may be referred to as bicycle components 11.

The two-wheeled vehicle 100 illustrated in FIG. 2 achieves an optically pleasant appearance since the operating lever of the quick release device 1 is only provided at the rear wheel. In the normal operational state the front wheel 101 is not provided with a clamping mechanism 3 with a pertaining operating lever. The same applies to the attachment of the seat post. When required, the clamping mechanism 3 may be released from the rear wheel by means of the operating lever and used for mounting and demounting the front wheel or the seat post or further bicycle components 11.

FIG. 3 shows a perspective overall view of a quick release device 1 according to the invention prior to inserting the clamping mechanism 3 in the axle unit 2. Thus, the coupling unit 16 of the clamping mechanism 3 is recognizable in FIG. 3. The axle unit 2 comprises the axle 5, which in this case is configured as a through axle, extending in the axial direction 4. The first end 7 of the axle 5 is provided with a locking means 6 while the second end 10 of the axle 5 is provided with a fastener 9. The fastener 9 in this exemplary embodiment is configured as an external thread 26 on the axle 5. In this exemplary embodiment the axle unit 2 is inserted through the dropouts and the hub of a wheel and the axle unit 2 is fastened to the frame 103 by means of the clamping mechanism 3 so that the hub 108 is clamped between the dropouts of the frame 103 or in the fork 104.

The clamping mechanism 3, which comprises a clamping component 13 and an operating lever 12 fastened thereto serves for operation. After inserting the coupling unit 16 of the clamping mechanism 3 into the connecting unit 17 (see FIG. 5) of the axle unit 2 the coupling unit 16 is non-rotatably coupled with the axle unit 2 so that in the engagement position 14 shown in FIG. 3, a rotary motion of the operating lever 12 causes a coupled rotary motion of the axle unit 2 and the axle 5, and thus also of the external thread 26 of the axle unit 2.

FIG. 4a shows a schematic cross-section of the clamping mechanism 3 and part of the axle unit 2 in the engagement position 14.

What is visible of the axle unit 2 is, part of the axle 5 and the locking means 6. The axle unit 2 comprises in its interior a connecting unit 17 having a connecting contour 19 (see FIG. 5).

The clamping mechanism 3 is substantially formed by the clamping component 13 and the operating lever 12. The operating lever 12 comprises a clamping sleeve 31 which presently is integral, one-piece, from which the handle of the operating lever extends radially outwardly.

The clamping component 13 is provided with a thread 30 with a push button 22 screwed in that is about mushroom-shaped.

The push button 22 comprises at its outwardly end a radially protruding collar 23 which in turn comprises a counter bearing 24 for the biasing device 21 disposed between the collar 23 and a shoulder 8 of the clamping sleeve 31. This biasing device 21 is configured as a coil spring which is supported on the one hand, on the radial shoulder 8 of the clamping sleeve 31, and on the other hand, on the counter bearing 24. Thus, the operating lever 12 is biased in the engagement position 14 shown in FIG. 4a. In this engagement position 14 the external toothing 39 of the clamping component 13 and the internal toothing 40 of the clamping sleeve 31 are in engagement with one another so that the operating lever 12 is non-rotatably coupled with the clamping component 13. The radially inwardly protruding shoulder 8 for supporting the biasing device 21 may also be formed by the internal toothing 40 of the clamping sleeve 31. A separately configured shoulder is likewise possible.

The contacting disc 34, which abuts the axially outwardly face of the locking means 6, serves for contacting and better guiding the clamping mechanism 3 on the axle unit 2.

To accommodate the clamping mechanism 3 on the axle unit 2 secure against loss, an O-ring 33 is provided in the interior of the connecting unit 17 of the locking means 6.

To transfer the operating lever 12 from the engagement position 14 to the rotary position 15 the operating lever 12 is moved axially outwardly away from the axle unit 2 in the axial direction 4.

Figure 4B:
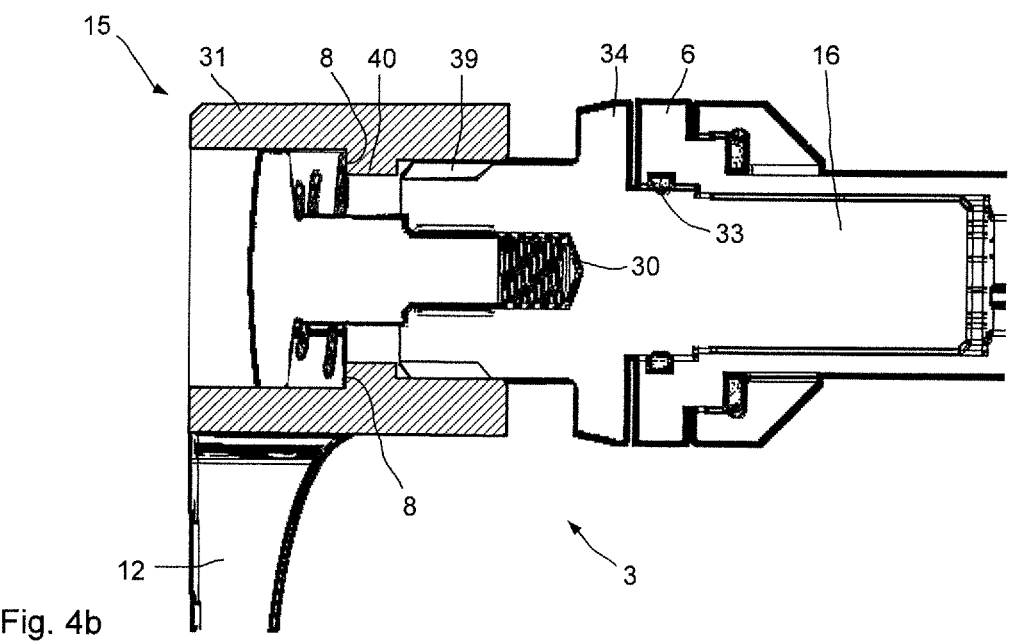
FIG. 4b an enlarged section of the quick release device according to FIG. 3 in the rotary position.

FIG. 4b shows a schematic sectional view of the clamping mechanism 3 in the rotary position 15. The operating lever 12 has been pulled axially outwardly by way of the clamping sleeve 31 so that the biasing device 21 is axially compressed. In the rotary position 15 shown the internal toothing 40 at the clamping sleeve 31 and the external toothing 39 at the clamping component are disengaged so as to allow free rotational movement of the operating lever 12 in both rotational directions. The user may employ the push button 22 for a counter bearing 24 for the force applied on the operating lever 12. This means that the user for example supports his thumb on the outside of the push button 22 to pull the operating lever 12 axially outwardly to the rotary position 15 against the force of the biasing device 21. After rotating to the desired position the user may release the operating lever 12 so that the operating lever 12 automatically returns to the engagement position 14 due to the biasing force of the biasing device 21.

FIG. 5 shows another perspective illustration of a part of the quick release device 1 where the connecting unit 17 with the inner connecting contour 19 at the axle unit 2 is recognizable. The coupling unit 16 comprises an external coupling contour 18 mating with the connecting contour 19 of the connecting unit 17. The coupling unit 16 and the connecting unit 17 are configured as an external hexagon and internal hexagon respectively.

Figure 6:
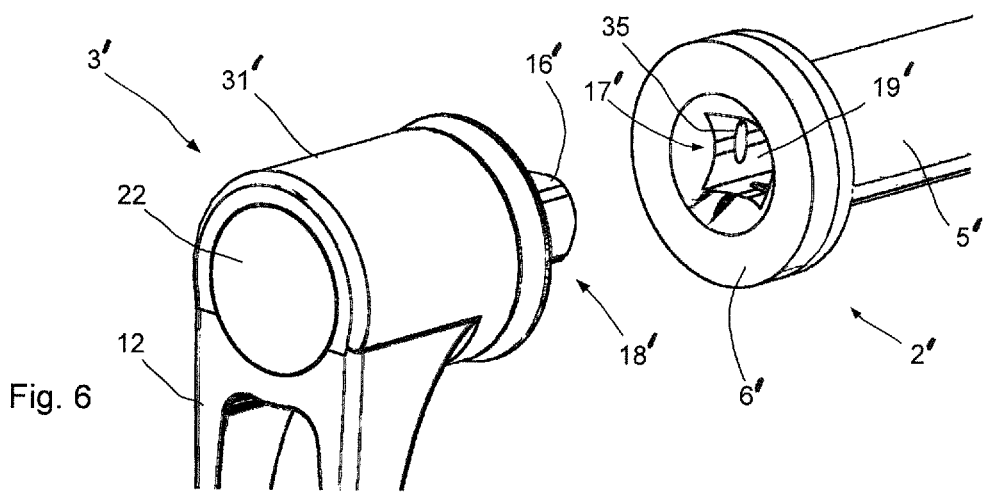
FIG. 6 another quick release device in a first, perspective view.

FIG. 6 shows another exemplary embodiment of a quick release device 1 according to the invention which in turn comprises an axle unit 2' and a clamping mechanism 3'.

The coupling contour 18' of the coupling unit 16' is configured as a square while the axle unit 2' is provided with a corresponding connecting contour 19' of the connecting unit 17' to accommodate the square of the coupling unit 16' so as to fit exactly.

In addition the axle unit 2' is provided with multiple click depressions 35 which are the elements of a click-in mechanism 20.

Figure 7:
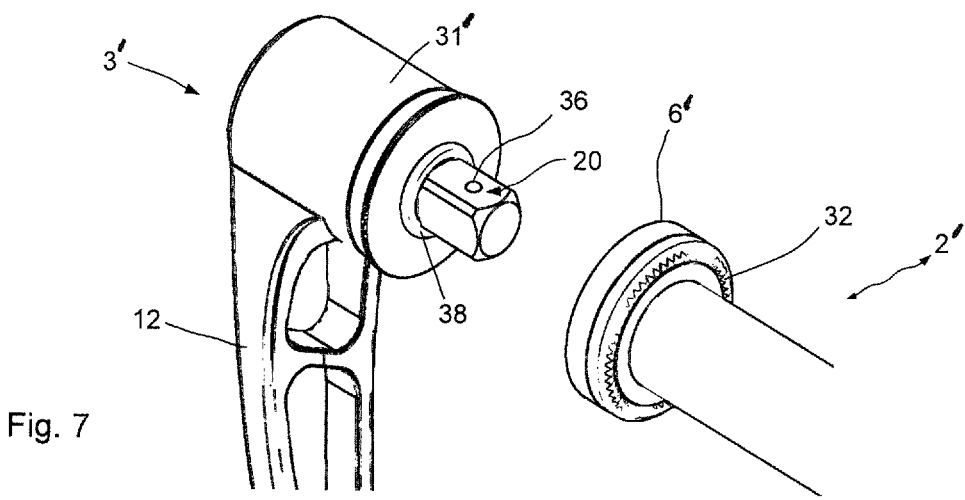
FIG. 7 the quick release device according to FIG. 6 in another perspective view.

FIG. 7 shows another perspective illustration of the quick release device 1 according to FIG. 6 wherein the snap-in projection 36 of the click-in mechanism 20 at the coupling unit 16' can be seen. The snap-in projection 36 is spring-biased to the position shown and serves to click into the click depression 35 in the connecting unit 17'. An O-ring 38 is provided at the transition between the contacting disc 34 and the coupling unit 16'.

The locking means 6' is provided with a knurled disk 32.

Figure 8:
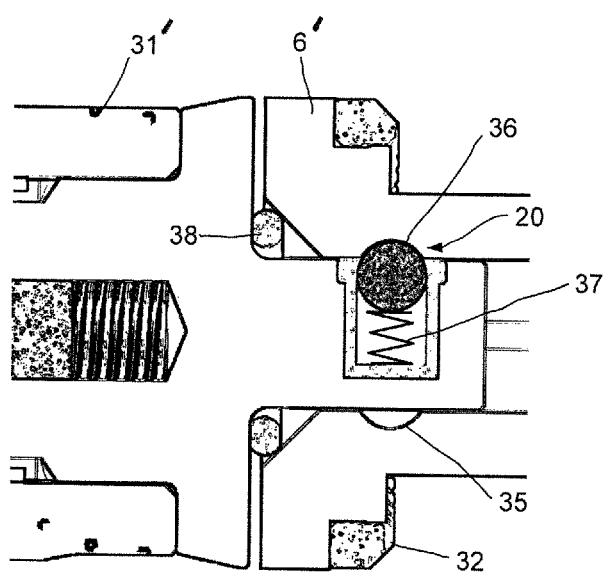
FIG. 8 a schematic section of the quick release device according to FIG. 6 in the assembled state.

FIG. 8 shows a schematic cross section of the quick release device 1 according to FIG. 6 in the assembled state. The snap-in projection 36 is formed by a ball which is biased by a stop spring 37 to the position shown. The ball and thus the snap-in projection 36 engages in one of the click depressions 35 provided, presently four. This achieves that the quick release device 1 is reliably retained on the axle unit 2'. A corresponding spring force allows to set the retaining force.

FIG. 9 shows another simplistic exemplary embodiment of another quick release device 1 according to the invention. The clamping mechanism 3" is illustrated on the left while the axle unit 2" is schematically illustrated on the right side.

FIG. 10 shows the front views of the clamping mechanism 3" and the axle unit 2". This connecting unit 17 forms a "male" connecting contour 29 which can engage in a "female" coupling contour 28 of the coupling unit 16". While it can be seen in FIG. 10 that the connecting contour 29 is configured as a square, it may also be a hexagon or show another toothing which interacts with a mating toothing or the like of the coupling unit 16".

In addition, a torque limiter 25 is provided to prevent a specified torque from being exceeded during mounting. In the illustrated embodiment, the torque limiter 25 is thus mounted to the operating lever 12 so that the operating lever 12 always applies specified torque is not exceeded.

FIG. 11 shows a schematic, perspective view of another exemplary embodiment of a quick release device according to the invention wherein the male connecting contour 29' of the connecting unit 17''' projects outwardly from the axle unit 2'''. The clamping mechanism 3''' is provided with a mating coupling unit 16''' having a female coupling contour 28''' in which the connecting contour 29''' of the connecting unit 17''' engages for example when mounting or demounting a wheel.

Figure 12:
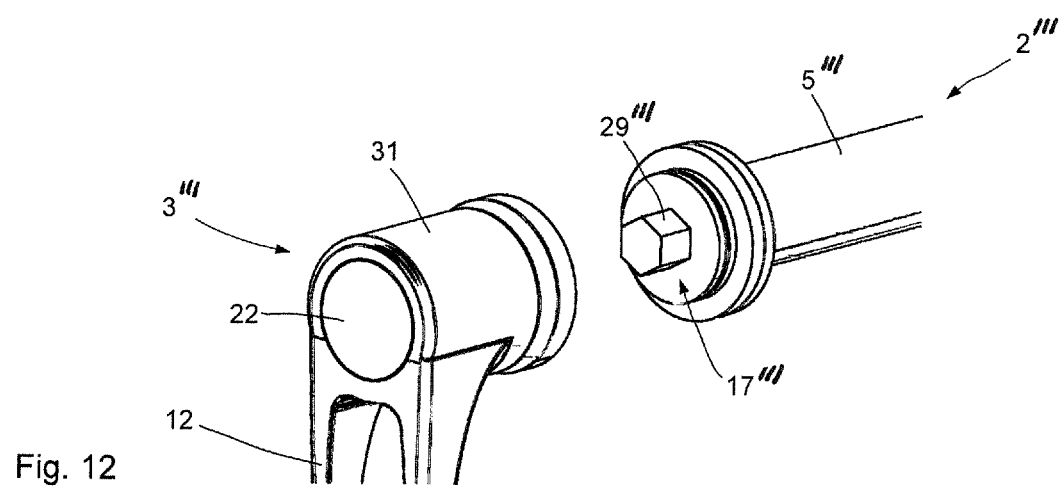
FIG. 12 the quick release device according to FIG. 11 in another perspective view.

FIG. 12 shows a schematic, perspective illustration from the other side wherein the connecting unit 17''' can be clearly seen with the connecting contour 29''' which is presently male.

Figure 13:
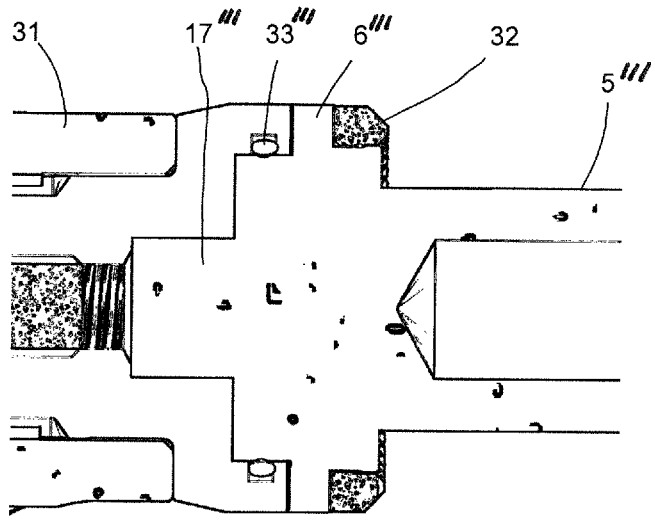
FIG. 13 a schematic cross section of the quick release device according to FIG. 11 in the engagement position.

FIG. 13 shows a schematic cross-section of the quick release device 1 which in terms of function operates exactly as in all the other exemplary embodiments, as regards coupling the operating lever 12 with the clamping component 13. As the cross-section according to FIG. 13 clearly shows, the connecting contour 29''' of the connecting unit 17''' projects into the clamping mechanism 3''' and it is in form-fitting connection with the coupling contour 28''' of the coupling unit 16'''.

On the whole, the invention provides a lightweight quick release device 1 which is very easy to operate. The option of disengaging the operating lever 12 from the clamping component 13 provides ease of mounting and demounting wheels. The length of the clamping component 13, which as a rule consists of strong steel, can be noticeably reduced. Even if the clamping component 13 is formed in part or in full from a light metal or the like, the total weight can be considerably reduced.

Since every gram of weight counts in sporting bicycles, this will considerably contribute to keeping the weight down. Moreover the aerodynamics and the optical appearance of a bicycle equipped therewith can be improved for example if a clamping mechanism 3 is only disposed on the rear wheel while the front wheel is only equipped with an axle unit 2.

While a particular embodiment of the quick release device has been described herein, it will be appreciated by those skilled in the art that changes and modifications may be made thereto without departing from the invention in its broader aspects and as set forth in the following claims.

LIST OF REFERENCE NUMERALS 1 quick release device
2 axle unit
3 clamping mechanism
4 axial direction
5 axle, through axle
6 locking means
7 first end
8 shoulder
9 fastener
10 second end
11 bicycle component
12 operating lever
13 clamping component
14 engagement position
15 rotary position
16 coupling unit
17 connecting unit
18 coupling contour (m)
19 connecting contour (f)
20 click-in mechanism
21 biasing device 22 push button
23 collar
24 counter bearing
25 torque limiter
26 external thread
27 bayonet joint
28 coupling contour (f)
29 connecting contour (m)
30 thread (in 13 and 22)
31 clamping sleeve
32 knurled disk
33 O-ring
34 contacting disc
35 click depression
36 snap-in projection
37 stop spring
38 O-ring
39 external toothing
40 internal toothing
41 length of overlap
42 diameter
100 two-wheeled vehicle, bicycle
101 wheel, front wheel
102 wheel, rear wheel
103 frame
104 fork
105 damper
106 handlebar
107 saddle
108 hub
109 spoke
110 rim
111 disk brake
112 drive

The invention claimed is:

1. A quick release device for muscle-powered two wheeled vehicles, comprising:
    an axle unit and a clamping mechanism, wherein the axle unit comprises an axle extending in an axial direction; a locking means at a first end of the axle unit; and a fastener at a second end of the axle unit; wherein the clamping mechanism is suitable for mounting and demounting the axle unit to a two-wheeled vehicle;
    the clamping mechanism comprises an operating lever and a clamping component connected therewith; the clamping component can be non-rotatably coupled with the axle unit; and the clamping component can be decoupled from the axle unit; and
    the operating lever of the clamping mechanism can be moved from an engagement position in which it is non-rotatably connected with the clamping component to a rotary position in which it is freely rotatable relative to the clamping component, while the clamping component may be non-rotatably coupled with the axle unit.

2. The quick release device according to claim 1, wherein the clamping component comprises a coupling unit having a non-round coupling contour for coupling with a mating connecting unit having a non-round connecting contour on the axle unit.

3. The quick release device according to claim 2, wherein the coupling unit of the clamping component is inserted in the connecting contour for mounting and demounting, or wherein the coupling unit of the clamping component is applied on the connecting contour of the connecting unit for mounting and demounting.

4. The quick release device according to claim 3, wherein the coupling unit shows an outer polygon and/or an inner polygon.

5. The quick release device according to claim 1, wherein at least one click-in mechanism is provided for the clamping component to click into the axle unit to accommodate the clamping mechanism on the axle unit secure against loss.

6. The quick release device according to claim 1, wherein the operating lever can be moved from the engagement position to the rotary position by way of movement in the axial direction relative to the clamping component.

7. The quick release device according to claim 1, wherein the operating lever is biased by way of a biasing device in the direction of the clamping component.

8. The quick release device according to claim 1, wherein the clamping component comprises at one end, the coupling unit for coupling with the axle unit and at the other end, a push button provided with a collar.

9. The quick release device according to claim 1, wherein in the engagement position the operating lever is coupled with the axle unit via a torque limiter.

10. The quick release device according to claim 1, wherein the axle unit is configured hollow at least at the second end.

11. The quick release mechanism according to claim 1, wherein the axle unit has an external thread at the second end.

12. The quick release device according to claim 1, wherein both the operating lever and the clamping component show non-round coupling contours mating with one another which are engaged with one another in the engagement position.

13. The quick release device according to claim 12, wherein the non-round coupling contours are configured as toothing on the operating lever and the clamping component.

14. The quick release device according to claim 13, wherein a ratio of a length of overlap of a coupling unit in engagement with a connecting unit relative to a diameter of the coupling unit is less than 3:1.

15. A clamping mechanism for mounting and demounting bicycle components, comprising: an operating lever and a clamping component connected therewith; wherein the clamping component can be non-rotatably coupled with a bicycle component; and wherein the clamping component can be decoupled from the bicycle component; and
    the operating lever can be moved from an engagement position in which it is non-rotatably connected with the clamping component to a rotary position in which it is freely rotatable relative to the clamping component while the clamping component may be non-rotatably coupled with the bicycle component.

16. A two-wheeled vehicle, comprising: a frame and a fork and an at least partially muscle-powered drive and two wheels, namely a front wheel and a rear wheel, wherein each wheel comprises a hub and a pertaining axle unit;
    a clamping mechanism is disposed, comprising an operating lever and a clamping component connected therewith wherein the clamping component can be non-rotatably coupled with the axle unit; and wherein the clamping component can be decoupled from the axle unit; and
    the operating lever of the clamping mechanism can be moved from an engagement position in which it is non-rotatably connected with the clamping component to a rotary position in which it is freely rotatable relative to the clamping component, while the clamping component may be non-rotatably coupled with the axle unit.

17. The two-wheeled vehicle according to preceding claim 16, wherein exactly one clamping mechanism is provided for mounting and demounting the wheels.

18. The two-wheeled vehicle according to claim 17, wherein the clamping mechanism is releasably fastened to the axle unit of the rear wheel.

\* \* \* \* \*